US012761190B2

(12) United States Patent
Svensson

(10) Patent No.: US 12,761,190 B2
(45) Date of Patent: Oct. 13, 2026

(54) QCM APPARATUS

(71) Applicant: Biolin Scientific AB, Västra Frölunda (SE)

(72) Inventor: Peter Svensson, Västra Frölunda (SE)

(73) Assignee: Biolin Scientific AB, Västra Frölunda (SE)

( * ) Notice: Subject to any disclaimer, the term of this patent is extended or adjusted under 35 U.S.C. 154(b) by 262 days.

(21) Appl. No.: 18/712,389

(22) PCT Filed: Dec. 1, 2022

(86) PCT No.: PCT/EP2022/084068
§ 371 (c)(1),
(2) Date: May 22, 2024

(87) PCT Pub. No.: WO2023/099664
PCT Pub. Date: Jun. 8, 2023

(65) Prior Publication Data

US 2025/0012764 A1 Jan. 9, 2025

(30) Foreign Application Priority Data

Dec. 3, 2021 (EP) .................................... 21212365

(51) Int. Cl.
*G01N 29/32* (2006.01)
*G01N 29/02* (2006.01)
(Continued)

(52) U.S. Cl.
CPC ......... *G01N 29/326* (2013.01); *G01N 29/022* (2013.01); *G01N 29/032* (2013.01); *G01N 29/222* (2013.01); *G01N 2291/0256* (2013.01)

(58) Field of Classification Search
CPC .. G01N 29/326; G01N 29/022; G01N 29/032; G01N 29/222; G01N 2291/0256; G01N 2291/0255; G01N 29/036
See application file for complete search history.

(56) References Cited

U.S. PATENT DOCUMENTS 6,189,367 B1 * 2/2001 Smith ................ G01N 25/4813 73/32 A
6,196,059 B1 * 3/2001 Kosslinger ........... G01N 29/022 73/61.49
(Continued)

FOREIGN PATENT DOCUMENTS

CN 109374730 B 4/2021
JP 201801925 A 1/2018
(Continued)

OTHER PUBLICATIONS

International Search Report of the ISA, issued in PCT/EP2022/084068, mailed Feb. 16, 2023; ISA/EP.

*Primary Examiner* — Toan N Pham
(74) *Attorney, Agent, or Firm* — Harness, Dickey & Pierce, P.L.C.; Anthony G. Fussner

(57) ABSTRACT

A QCM sensor apparatus comprising a sensor holder (2) having a compartment for receiving a QCM sensor, the compartment having a substantially planar extension, a first temperature sensor (14*a*) and a second temperature sensor (14*b*) arranged separated from each other along a line transverse to the planar extension; and a controller (13) configured to determine a temperature difference, ΔT, between the two sensors, and operating the QCM apparatus based on this temperature difference. By determining and monitoring not only the temperature in the compartment where a QCM sensor is arranged, but also the temperature difference ΔT, the controller may therefore improve measurement performance during use of the QCM sensor apparatus.

15 Claims, 4 Drawing Sheets

(51) Int. Cl.

| | |
|---|---|
| ***G01N 29/032*** | (2006.01) |
| ***G01N 29/22*** | (2006.01) |

(56) References Cited

U.S. PATENT DOCUMENTS

| | | | | |
|---|---|---|---|---|
| 9,086,338 | B2 * | 7/2015 | Shinobu | G01N 5/02 |
| 2009/0173158 | A1 | 7/2009 | Gehring | |
| 2020/0274493 | A1 * | 8/2020 | Yanagisawa | G01K 11/26 |
| 2025/0305988 | A1 * | 10/2025 | Tsuchiya | G01N 29/036 |

FOREIGN PATENT DOCUMENTS

| | | | |
|---|---|---|---|
| JP | 2018019215 | A | 2/2018 |
| JP | 2018141700 | A | 9/2018 |

* cited by examiner

QCM APPARATUS

CROSS-REFERENCE TO RELATED APPLICATIONS

This application is a 371 U.S. National Phase of International Application No. PCT/EP2022/084068 filed Dec. 1, 2022, which claims priority to European Patent application Ser. No. 21212365.7 filed Dec. 3, 2021. The entire disclosures of the above applications are incorporated herein by reference.

FIELD OF THE INVENTION

The present invention relates to a quartz crystal microbalance (QCM) sensing apparatus with improved temperature control.

BACKGROUND OF THE INVENTION

Quartz crystal microbalance (QCM) sensing has gained increasing popularity as an efficient sensing technique for detecting molecular adsorption (or desorption) on a substrate. In QCM sensing a liquid containing a substance is allowed to flow past a sensing element (QCM sensor) including a crystal disc sandwiched between a pair of electrodes. An AC voltage is connected to the electrodes, causing the disc to oscillate at its acoustic resonance frequency, and the system is allowed to reach a steady state. As molecular adsorption creates a film on the QCM sensor surface, the resonance frequency changes. A frequency detection device is connected to detect this change, thereby allowing determination of the mass of the adsorption layer.

One particularly useful sensing approach is QCM with dissipation monitoring, referred to as QCM-D. In QCM-D sensing, the induced oscillation is allowed to decay ("ring off") and an energy dissipation factor is determined. Changes in this dissipation factor are related to the viscoelasticity (softness) of the adsorption layer.

In QCM sensing applications, it is well known that temperature control is critical, and that even a rather small temperature change may cause interference in the same order of magnitude as the actual measurement signals. For this purpose, most QCM measurement systems are provided with a temperature control system, typically including a thermoelectric control element (e.g. a Peltier element), optionally a heat source/heat sink, a suitably placed temperature sensor, and suitable control logic. The thermoelectric element is typically arranged on the opposite side of the QCM sensor with respect to the measurement channel.

One example is provided by JP 2018 01925 where two sensors are arranged below the QCM sensor.

However, despite adequate temperature control, it has been noted that the QCM resonance frequency will still require an extensive time period to adapt to a new temperature setting.

Based on this, it would be desirable to provide a QCM sensing apparatus with an improved temperature control.

GENERAL DISCLOSURE OF THE INVENTION

This and other objects are achieved with a quartz crystal microbalance, QCM, sensor apparatus comprising a sensor holder having a substantially planar compartment for receiving a QCM sensor, a first temperature sensor and a second temperature sensor arranged separated from each other along a line transverse to the planar compartment, and a controller configured to determine a temperature difference, $\Delta T$, between the two sensors, and operating the QCM apparatus based on this temperature difference.

By "transverse" is intended a direction which includes a component normal to the planar extension of the compartment. As the temperature sensors are separated in this direction, the detected temperature difference $\Delta T$ will be indicative of a temperature gradient across the compartment, and thus across a sensor placed in the compartment.

It is noted that it is typically not possible to completely eliminate the temperature difference across the sensor, due to thermal resistance in the compartment and the QCM sensorcompartment. However, the invention is based on the surprising realization that the QCM frequency measurement process is highly sensitive to changes in the temperature across the QCM sensor. It has been shown that the QCM frequency measurement will not be stable until the temperature gradient across the QCM sensor is substantially stable. As the detected temperature difference $\Delta T$ is indicative of the temperature gradient across the QCM sensor, the QCM frequency measurement will be stable when $d/dt\ \Delta T \approx 0$. By determining and monitoring not only the temperature in the compartment where the QCM sensor is arranged, but also the temperature difference $\Delta T$, the controller may therefore improve measurement performance during use of the QCM sensor apparatus.

For example, when the temperature difference is considered stable (variation within given limits) the controller may provide an indication that the QCM frequency measurement can be assumed to be stable and reliable. Alternatively, the temperature difference is simply made available to a user (e.g. displayed on a display) to enable the user to assess when the measurement output is reliable.

Preferably, the apparatus comprises a thermoelectric element arranged in thermal connection with the sensor holder, which thermoelectric element is controlled by the controller. In this case, the controller may be configured to apply a temperature control based on temperature difference $\Delta T$ feedback, thereby ensuring a faster stabilization of the temperature difference $\Delta T$ and thus reliable QCM measurement. The temperature difference may be used as a feedback variable in a convention control loop, designed to stabilize this feedback variable.

The first and second temperature sensors are preferably arranged on opposite sides of the compartment. This even further improves the correlation between the detected temperature difference $\Delta T$ and the temperature gradient across the sensor. The operation of the apparatus may thus be even more reliable.

The apparatus may comprise an additional thermoelectric element arranged on an opposite side of the sensor holder with respect to the (first) thermoelectric element. Having two (or more) thermoelectric elements may improve the ability to more accurately control the temperature, and more quickly ensure the desired temperature.

The apparatus may further comprise a plurality of sample fluid containers, a fluid selector unit for selectively placing one of the sample fluid containers in fluid connection with a measurement cell formed above the sensor. The fluid selector unit has a plurality of inlet ports, each inlet port in fluid connection with a sample fluid container, a sensing outlet configured to be in fluid connection with the sensor, and a valve arrangement for selectively connecting one of the inlets to the outlet.

The fluid selector unit serves as a valve, to selectively connect one of the sample fluid containers to the measuring cell, and to provide a desired flow of sample fluid past the sensor. The fluid selector unit may be designed to integrate the fluid sample containers with the sensor holder in a relatively confined space. For example, the fluid selector unit may include a small-scale fluidics system, with channels and valves, to enable such integration. Examples of such small sale fluidics systems are sometimes referred to as a "lab-on-chip".

The fluid selector unit may be sandwiched between the fluid sample containers and the sample holder, which may also be advantageous for reducing the size of the apparatus.

The thermoelectrical element may be arranged on an opposite side of the sensor holder with respect to the sample fluid containers. In case of a vertical arrangement (sometimes referred to as a "vertical stack"), with the sample fluid containers in an upper part of the apparatus, this means that the thermoelectric element is arranged below the sensor holder, which is advantageous for thermal dissipation. In a vertical arrangement, force of gravity may promote fluid flow through the apparatus.

In one embodiment, the sample fluid containers, fluid selector unit and sensor holder are arranged inside a thermally insulating housing, an interior of the compartment having a substantially homogeneous temperature.

By integrating the components of the sensing apparatus into a comparably small space, and arranging them inside a temperature isolating housing, temperature control is significantly facilitated.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
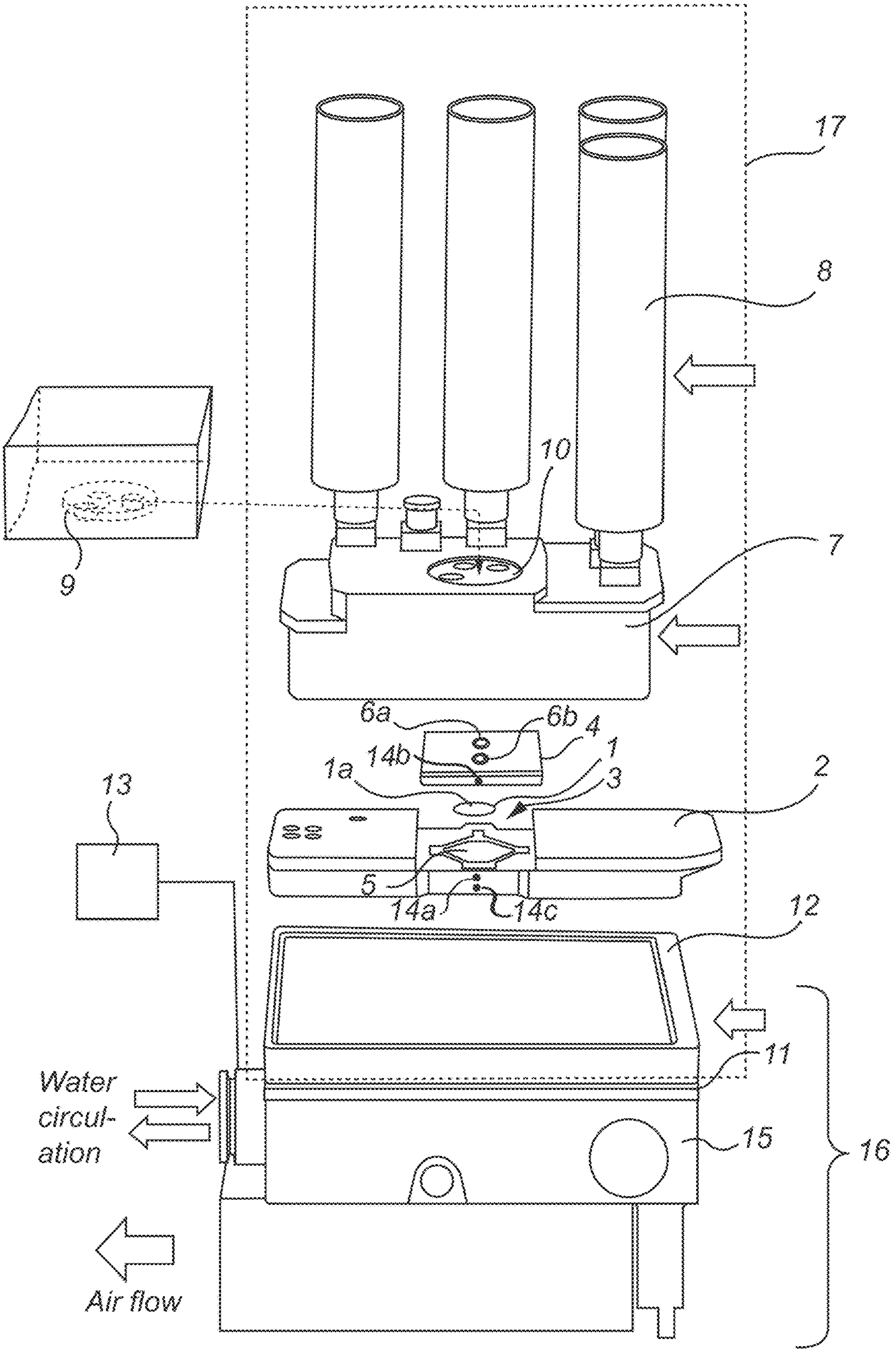
FIG. 1 is an exploded view of parts of a QCM sensing apparatus according to an embodiment of the invention.

The QCM sensing apparatus in FIG. 1 includes a QCM sensor 1 arranged in a sensor holder 2. The QCM sensor includes a typically disc shaped crystal sandwiched between two electrical electrodes. The holder has a substantially planar compartment 3 configured to receive the sensor 1. The compartment is sealed by a lid 4. When a sensor 1 is placed in the compartment 3, and the compartment is closed by the lid 4, the space above the sensor 1 forms a measuring cell 5, allowing a fluid to flow across a surface 1*a* of the sensor 1. The lid 4 is provided with two openings 6*a*, 6*b*, providing access to the measuring cell 5.

In use, an AC voltage is connected to the electrodes, causing the crystal disc to oscillate at its acoustic resonance frequency, and the system is allowed to reach a steady state. A frequency detection device (not shown) is connected to detect and monitor this frequency. When fluid flows across the sensor, a film will be created on the sensor surface due to adsorption of molecules present in the fluid. The film will in turn cause a change of the steady-state resonance frequency. The resonance frequency is provided as a measurement output.

The apparatus further includes a plurality of sample fluid containers 8, here in the form of four vertical tubes, arranged on a fluid selector unit 7. The fluid selector unit 7 comprises a valve arrangement 10, configured to selectively connect one of the sample fluid containers 8 to the measuring cell 5. An actuator 9, e.g. an electrical step motor, is arranged in mechanical connection with the valve arrangement 10, so as to be capable of operating the valve arrangement 10 to connect one of the sample fluid containers 8 with the measurement cell 5. In the illustrated example, the actuator 9 has a set of pins (se FIG. 3) configured to engage corresponding recesses 10 in the valve arrangement 10.

The apparatus further includes a temperature control arrangement 16, here including a thermoelectric element 11, a heat transfer block 12, a controller 13, temperature sensors 14*a*, 14*b*, 14*c* and an optional heat source/sink 15.

The thermoelectric element 11 is arranged on an opposite side of the sample holder 2 with respect to the fluid selector unit 7 (i.e. below the sample holder 2 in FIG. 1). The thermoelectric element 11 may be e.g. a Peltier element. A heat transfer block 12 may be sandwiched between the sample holder 2 and the thermoelectric element 11 to improve heat transfer. Optionally, a heat source/sink 15 (heating or cooling) is arranged on the other side of the thermoelectric element 11. In some embodiments, an additional thermoelectric element (not shown) may be provided on the other side of the sensor holder, e.g. in or adjacent to the fluid selector 7.

The first and second temperature sensors are arranged so as to be separated from each other along a line transverse to the planar extension of the sensor compartment 3 (and of the sensor 2 itself). In the illustrated example, the temperature sensors 14*a*, 14*b* are arranged on opposite sides of the compartment 3. Specifically, a first temperature sensor 14*a* is arranged between the measurement cell 5 and the thermoelectric element 11, and a second sensor 14*b* is arranged on the opposite side of the measurement cell 5 (and thus of the sensor 1). In the illustrated example, the first sensor 14*a* is arranged in the body of the sensor holder 2, and the second sensor 14*b* is arranged in the lid 4 of the sensor holder 2.

A third temperature sensor 14*c* may be arranged in the heat transfer block 12, i.e. closer to the thermoelectric element 11.

A controller 13 is configured to control the thermoelectric element 11 (and optionally the heat source/sink 15) based on feedback from the sensors 14*a*, 14*b* to reach and maintain a desired temperature in the measurement cell. By arranging several sensors in different locations, a faster and more accurate temperature control may be achieved. For example, multiple sensors may allow a control scheme known as "cascade control".

In some embodiments, the sample fluid containers 8, fluid selector unit 7, and sample holder 2 are enclosed by a thermally isolating enclosure (see FIG. 2), thereby defining a temperature zone 17 inside which the temperature is substantially homogeneous. The temperature inside the zone 17 is controlled to a desired temperature by temperature control arrangement 16.

It is noted that the QCM apparatus in FIG. 1 requires additional components in order to operational, such as signal generator, a frequency detection apparatus, and possibly air/water supply to the heat source. Such components are not disclosed in detail here, as they are not considered relevant for the disclosure of the present invention.

The controller 13 is further configured to determine a temperature difference, $\Delta T$, between the two sensors 14*a*, 14*b* on opposite sides of the measurement cell 5, and to operate the QCM apparatus based on this temperature difference $\Delta T$.

In one embodiment, the controller 13 is configured to present the temperature difference on a display (not shown), enabling a user to take appropriate action. For example, a user may await a stable temperature difference before making a reading of the measurement output.

In one embodiment, the controller is configured to provide an indication (e.g. audio or visual) of when the temperature difference ΔT is stable (e.g. constant). For example, the controller 13 may provide a sound or light signal when the temperature difference has stayed within a given range for a given amount of time. The signal may be taken as an indication that the temperature difference is stable, and that consequently the measurement output of the apparatus may be considered to be accurate and reliable.

In another embodiment, the controller 13 is configured to control the thermoelectric element 11 using the temperature difference ΔT as a feedback variable. The feedback temperature control can thus be designed not only to reach and maintain a desired temperature, but also to keep the temperature difference ΔT constant. Such control may serve to more quickly reach a constant ΔT, and thus a reliable measurement output.

It is noted that both approaches, i.e. indication of stable ΔT and feedback control of ΔT, may be applied in combination.

If an additional thermoelectric element is arranged on the opposite side of the sensor holder 2 with respect to the thermoelectric element 11, i.e. above the sensor holder 2 in FIG. 1, regulation of temperature on both sides of the sensor 1 is possible, thereby facilitating control of the temperature difference ΔT.

Figure 2:
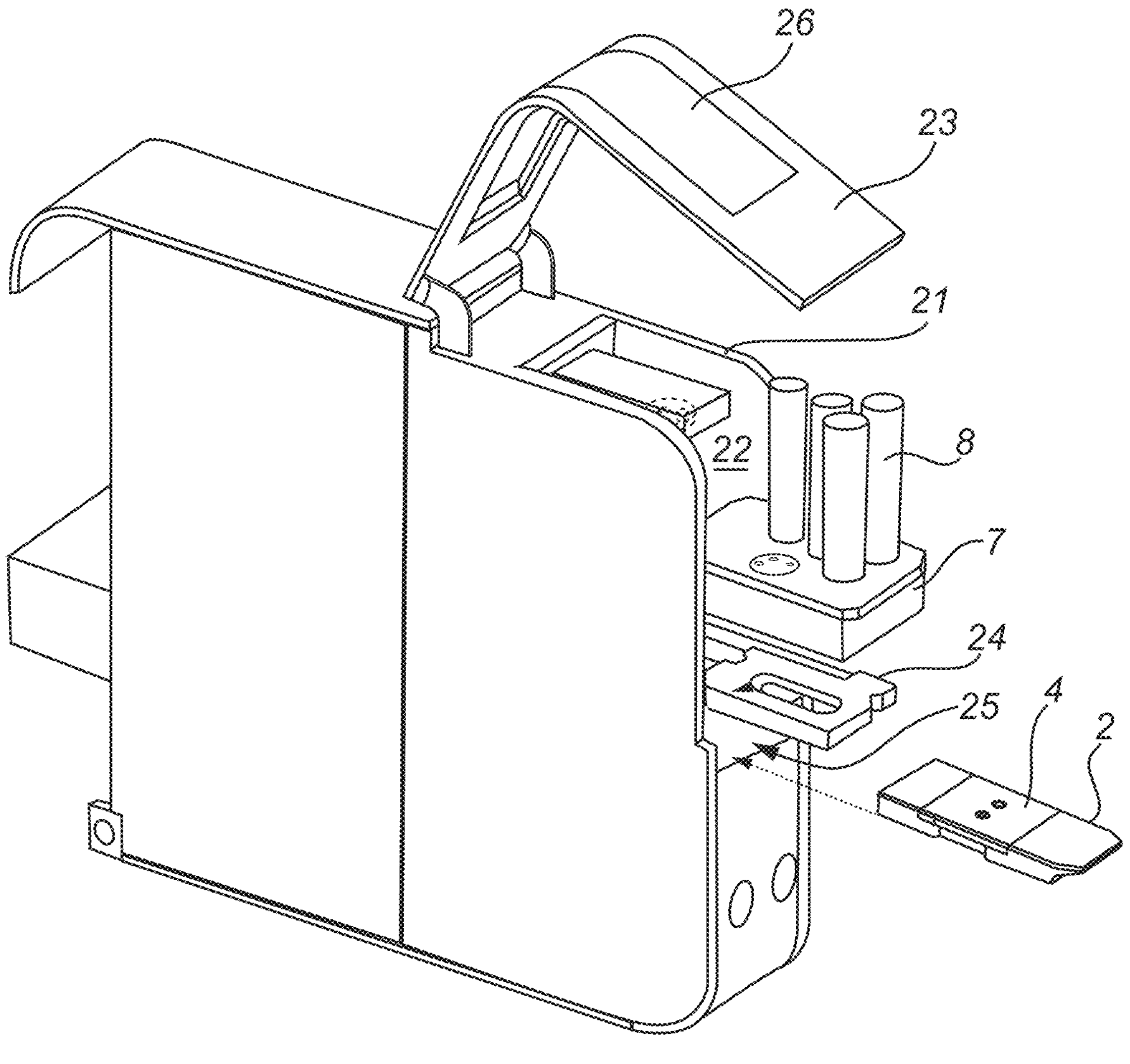
FIG. 2 is a perspective view of the apparatus in FIG. 1.

With reference to FIG. 2, the parts illustrated in FIG. 1 are arranged in a compartment 22 of an enclosure 21. It is this compartment 22 that forms the temperature zone 17. At least the part of enclosure 21 that surrounds the compartment 22 is designed to be thermally isolating, i.e. have a comparably large thermal resistance. As an example, the enclosure may be made of a plastic material. It may further comprise foam or other porous materials, serving as heat isolators. The enclosure may also comprise multiple rigid layers with air in between, similar to a thermos.

The enclosure 21 further has a lid 23 which is openable to allow access to the compartment 22. With the lid 23 in its open position, a sliding tray 24 may be pulled out, and the fluid selector unit 7 with its sample fluid containers 8 may be placed on the sliding tray 24 before it is pushed back into the compartment 22. The sensor holder 2 is insertable in a location 25 under the fluid selector unit. The sensor holder 2 is thus releasably arranged in the apparatus, independently of the fluid selector unit 7, and may be withdrawn in order to allow replacement of the sensor 1.

The lid may be provided with a transparent window 26, allowing a user to observe the fluid sample containers 8. In order to be heat isolating, the window may comprise double layers of suitable material, e.g. glass or transparent plastic. To improve visibility, the compartment 22 may further be provided with appropriate illumination (not shown).

Figure 3:
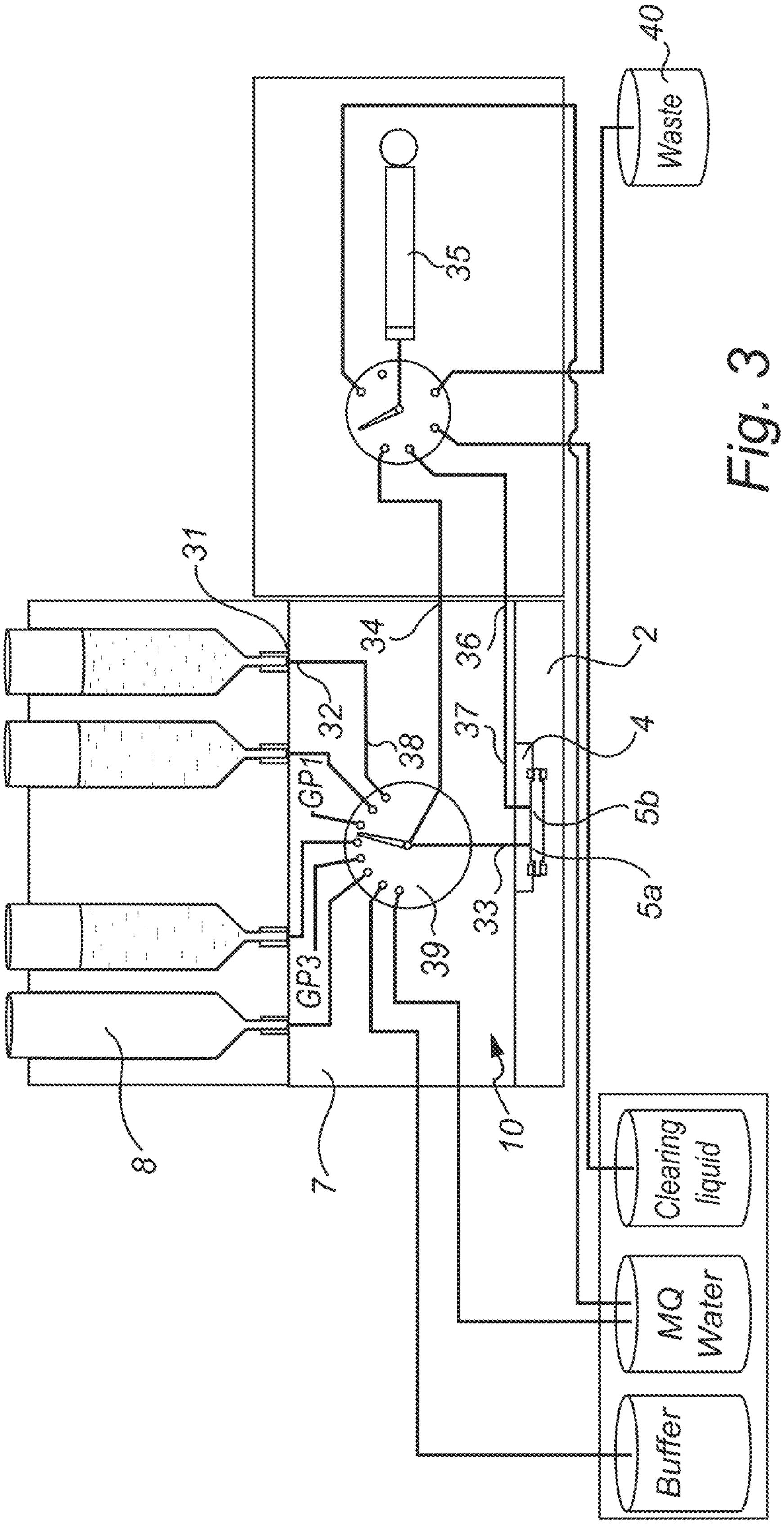
FIG. 3 is a schematic view of the fluid control in the apparatus in FIG. 1.

Turning to FIG. 3, the fluid control of the QCM sensing apparatus in FIGS. 1-2 is shown in more detail.

In the illustrated example, each sample fluid container 8 is provided with a bottom opening 31, connected to a corresponding inlet port 32 on the upper surface of the fluid selector unit 7. With this design, each inlet port 32 will be exposed to a fluid pressure from the pillar of sample fluid in the container 8.

The fluid selector unit 7 further has a first outlet 33, referred to as a sensing outlet, connected to opening 6*a* of the lid 4 of the sensor holder 2, thereby providing access to one end 5*a* of the measurement cell 5. In the illustrated example, the fluid selector unit 7 also has a second outlet referred to as a drain outlet 34.

A pump 35 is selectively connected to the other end 5*b* of the measurement cell 5 or the drain outlet 34. The pump 35 may be connected directly to opening 6*b* of the lid of the sample holder 2 to have access to the measurement cell 5. However, in the illustrated embodiment, the pump is connected to a port 36 of the fluid selection unit 7, and this port 36 is connected to the other end 5*b* of the measurement cell 5 via a conduit 37 formed in the fluid selector unit 7. With this design, the sensor holder 2 only requires a two-terminal interface with the fluid selector unit 7. This two-terminal interface is provided by the openings 6*a*, 6*b*.

As mentioned above, a valve arrangement 10 is configured to selectively connect one of the inlet ports 32 with the sensing outlet 33, and also to the drain outlet 34 when available. The valve arrangement 10 generally includes a set of conduits 38 formed within a solid body of the selector unit 7, each conduit connecting one of the inlet ports 32 with the outlet(s) 33, 34. The valve arrangement is configured so that each conduit 38 has an open state, in which fluid is allowed to flow through the conduit, and a closed state, in which fluid is prevented from flowing through the conduit. In the illustrated example, the valve arrangement includes is a rotating disc valve 39, described in more detail with reference to FIG. 4.

When the pump 35 is connected to the measurement cell 5, a flow of fluid is created from a sample fluid container 8 connected to the sensing outlet 33 past the sensor 1, to a waste container 40. When the pump 35 is connected to the drain outlet 34, a flow is created directly from the connected sample fluid container to the waste container 40.

Figure 4:
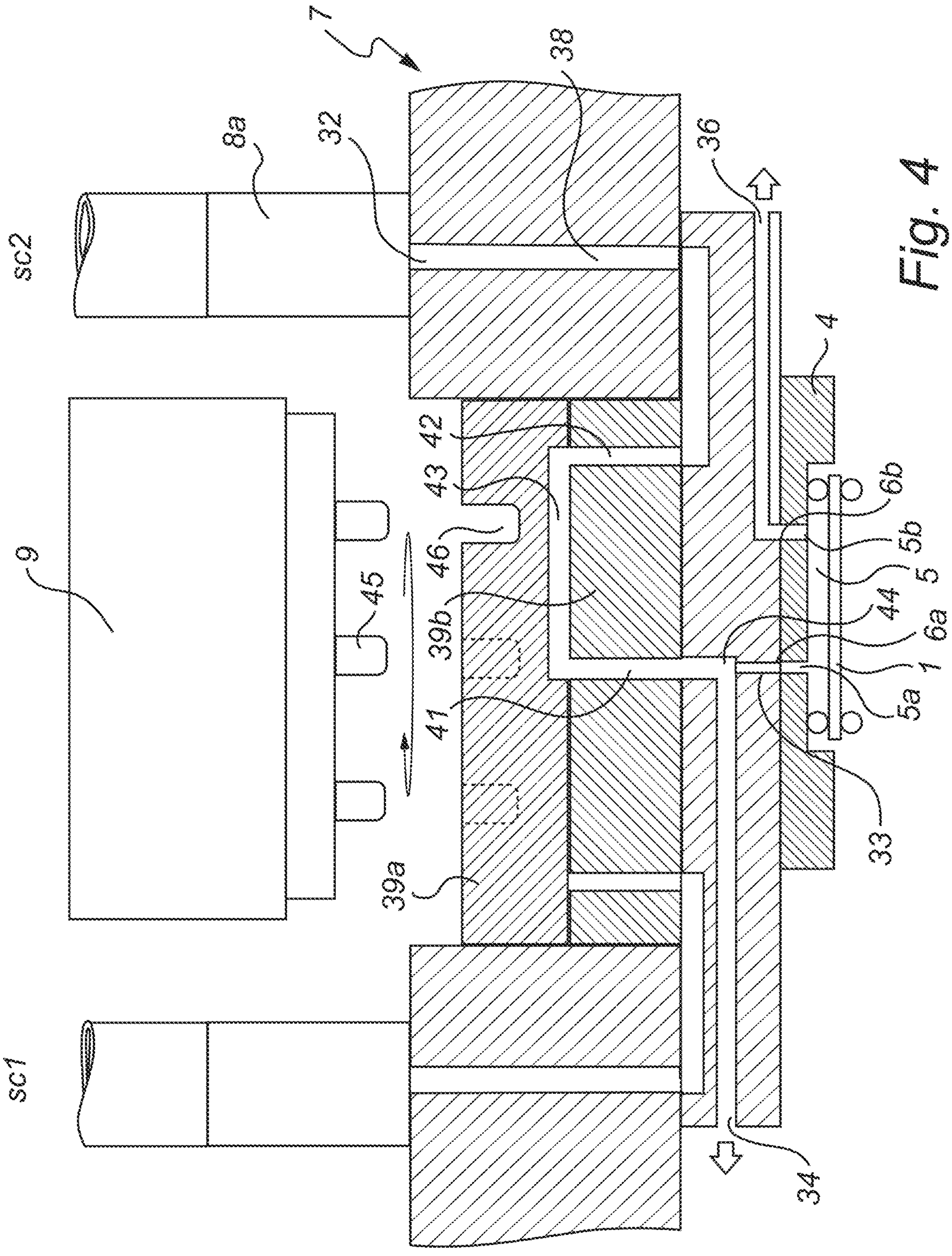
FIG. 4 shows in more detail an example of a valve arrangement in the apparatus in FIG. 1.

The details of the rotating disc valve 39 are shown more clearly in FIG. 4.

In the illustrated case, the disc valve 39 comprises a first, rotating disc 39*a* rotationally arranged on a second, stationary disc 39*b*. The stationary disc 39*b* has a central through channel 41, aligned with the axis of rotation, and a set of peripheral through channels 42 each arranged at a common radial distance from the central though channel. This means that the openings of the peripheral through channels 42 are located along a circle surrounding the central channel 41. The rotating disc 39*a* is formed with a radial connection channel 43, extending from the center to a peripheral position aligned with the channels 42. By rotating the rotating disc 39*a*, the central through channel 41 is connected to one of the peripheral through channels 42 by the radial channel 43.

In principle, the rotating disc 39*a* could rest directly on the surface of the fluid selector unit 7. However, the interface between rotating disc 39*a* and its support needs to be liquid tight, and thus requires high tolerance machining and surface processing. Therefore, it is easier to manufacture the valve with two discs rotationally connected with a liquid tight interface, and then sealingly fix (e.g. glue or solder) one of the discs to the supporting structure, i.e. in this case the fluid selector unit 7.

Each of the sample fluid containers 8 is connected to one of the peripheral through channels 42 by a conduit 38, while the central through channel 41 is connected to a mixing point 44, in fluid connection with sensing outlet 33 and drain outlet 34.

In use, the actuator 9 is mechanically connected to the rotating disc 39*a*, e.g. by protrusions 45 engaging recesses 46 in the rotating disc 39*a*. The actuator 9 rotates the rotating disc 39*a* to a desired position, in which one of the containers 8*a* is placed in fluid connection with the mixing point 44. Then, pump 35 is connected to drain outlet 34, and activated to promote a flow of liquid from the container 8*a* to the waste container 40. When it can be safely concluded that the sample fluid from container 8*a* has reached the mixing point 44, the pump 35 is instead connected to the outlet 36, connected to the measuring cell 5. This promotes a flow of liquid from container 8*a* past the sensor 1, thereby enabling measurement.

The person skilled in the art realizes that the present invention by no means is limited to the preferred embodiments described above. On the contrary, many modifications and variations are possible within the scope of the appended claims. For example, the shape and form of the apparatus may be different from the illustrated example. The relative arrangement of the various components may also be different, and for example are not necessarily arranged in a vertical stack.

The invention claimed is:

1. A quartz crystal microbalance, QCM, sensor apparatus comprising:

- a sensor holder having a compartment for receiving a QCM sensor, said compartment having a substantially planar extension;
- a first temperature sensor and a second temperature sensor arranged separated from each other along a line transverse to said planar extension; and
- a controller configured to determine a temperature difference between the two sensors, and to operate the QCM sensor apparatus based on this temperature difference.

2. The sensor apparatus according to claim 1, wherein the controller is configured to display said determined temperature difference on a display.

3. The sensor apparatus according to claim 1, wherein the controller is configured to determine when the temperature difference has stayed within a given range for a given amount of time, and, in response to this determination, provide an indication.

4. The sensor apparatus according to claim 1, further comprising a thermoelectric element arranged in thermal connection with the sensor holder, said thermoelectric element being controlled by said controller.

5. The sensor apparatus according to claim 4, wherein the controller is configured to control said thermoelectric element based on the determined temperature difference, so as to achieve a stable temperature difference.

6. The sensor apparatus according to claim 4, wherein the thermoelectrical element is a Peltier element.

7. The sensor apparatus according to claim 1, wherein said first and second temperature sensors are arranged on opposite sides of the compartment.

8. The sensor apparatus according to claim 1, further comprising an additional thermoelectric element arranged on an opposite side of the sensor holder with respect to the thermoelectric element.

9. A quartz crystal microbalance, QCM, sensor apparatus comprising:

- a sensor holder having a compartment for receiving a QCM sensor, said compartment having a substantially planar extension;
- a first temperature sensor and a second temperature sensor arranged separated from each other along a line transverse to said planar extension;
- a controller configured to determine a temperature difference between the two sensors, and to operate the QCM sensor apparatus based on this temperature difference;
- a plurality of sample fluid containers;
- a fluid selector unit for selectively placing one of said sample fluid containers in fluid connection with a measurement cell formed above the QCM sensor, said fluid selector unit having:
  - a plurality of inlet ports, each inlet port in fluid connection with a sample fluid container,
  - a sensing outlet configured to be in fluid connection with said QCM sensor, and
  - a valve arrangement for selectively connecting one of said inlets to said outlet.

10. The sensor apparatus according to claim 9, wherein said fluid selector unit is sandwiched between the fluid sample containers and the sample holder.

11. The sensor apparatus according to claim 10, wherein the thermoelectrical element is a Peltier element.

12. The sensor apparatus according to claim 9, further comprising a thermoelectrical element arranged on an opposite side of the sensor holder with respect to the sample fluid containers.

13. The sensor apparatus according to claim 9, wherein the sample fluid containers, fluid selector unit and sensor holder are arranged in a vertical stack arrangement.

14. The sensor apparatus according to claim 9, further comprising a thermally insulating housing in which the sample fluid containers, fluid selector unit and sensor holder are contained, an interior of the housing having a substantially homogeneous temperature.

15. The sensor apparatus according to claim 14,

- wherein the sensor holder is removably mounted inside the housing, and
- wherein the housing has an openable lid to allow removal/insertion of the sensor holder.

* * * * *